United States Patent [19]

Narita et al.

[11] Patent Number: 4,808,192

[45] Date of Patent: Feb. 28, 1989

[54] PROCESS FOR PREPARATION OF WATER SOLUBLE DYES CONTAINING LITHIUM SULFONATE GROUP OR AMMONIUM SULFONATE GROUP BY CATION EXCHANGE, NEUTRALIZATION AND REVERSE OSMOSIS

[75] Inventors: Yoshihiro Narita, Komae; Hiroshi Takimoto, Yokohama; Hideo Sano, Kawasaki, all of Japan

[73] Assignee: Mitsubishi Chemical Industries Limited, Tokyo, Japan

[21] Appl. No.: 908,023

[22] Filed: Sep. 15, 1986

[30] Foreign Application Priority Data

Sep. 17, 1985 [JP] Japan ................ 60-204921

[51] Int. Cl.$^4$ .................. C09B 67/54; C09B 69/02
[52] U.S. Cl. .................................... 8/527; 8/620; 8/680; 8/937
[58] Field of Search .................... 8/527, 620

[56] References Cited

U.S. PATENT DOCUMENTS

| | | | |
|---|---|---|---|
| 4,002,424 | 1/1977 | Smith | 8/527 |
| 4,077,767 | 3/1978 | Bleck et al. | 8/436 |
| 4,260,391 | 4/1981 | Lacroix | 8/519 |
| 4,560,480 | 12/1985 | Lacroix et al. | 210/638 |
| 4,648,883 | 3/1987 | Podder | 8/527 |
| 4,673,410 | 6/1987 | Sandefur et al. | 8/528 |
| 4,702,744 | 10/1987 | Wolff et al. | 8/527 |

FOREIGN PATENT DOCUMENTS

| | | |
|---|---|---|
| 260563 | 3/1988 | European Pat. Off. |
| 3521129 | 12/1986 | Fed. Rep. of Germany |
| 2015018 | 9/1979 | United Kingdom |

*Primary Examiner*—A. Lionel Clingman
*Attorney, Agent, or Firm*—Jordan B. Bierman

[57] ABSTRACT

In accordance with this invention an aqueous solution of a water-soluble dye containing lithium sulfonate group or ammonium sulfonate group can be obtained by a very simple and economical process in such a way that an aqueous solution of a water-soluble dye containing sodium sulfonate group is fed to a packed column packed with acid type cation exchange resin (H-form) to form an aqueous solution of a dye containing a free sulfonic acid group, and after neutralizing the resulting solution with LiOH or NH$_4$OH, the aqueous solution of the dye thus obtained is concentrated according to a process for separation through reverse osmotic membrane.

9 Claims, No Drawings

PROCESS FOR PREPARATION OF WATER SOLUBLE DYES CONTAINING LITHIUM SULFONATE GROUP OR AMMONIUM SULFONATE GROUP BY CATION EXCHANGE, NEUTRALIZATION AND REVERSE OSMOSIS

FIELD OF THE INVENTION

This invention relates to a process for preparation of water-soluble dyes containing lithium sulfonate group or ammonium sulfonate group. More particularly, this invention relates to a process for preparation of water-soluble dyes containing lithium sulfonate group or ammonium sulfonate group which have large solubility adapted for use in an ink-jet printing ink.

BACKGROUND OF THE INVENTION

Recently, there are seen many cases where water-soluble dyes containing sulfonate group are utilized in the field of information recording materials.

In most of these cases, as the sulfonate, sodium sulfonate is used. This is not only because the sodium salt is inexpensive but also because most of the dyes, though they are used in the field of electronic materials, have been diverted from the commercially available dyes for fibers.

When water-soluble dyes containing sodium sulfonate group (hereinafter abbreviated to "sodium type of dyes") are used, for example, as an ink composition for ink jet recording, heretofore, not a few dyes have proved unfit for practical use because of their insufficiency in solubility, especially the solubility in glycols that may be added as liquid medium, in spite of the fact that they are excellent in the aspect of qualities such as color tone, light fastness, etc. However, with regard to these dyes, it was found that when the sodium salt is replaced by lithium salt or ammonium salt, their solubilities in glycols and amides can be remarkably improved making it possible to obtain an ink composition having a dye concentration satisfactory from the practical viewpoint.

As the conventional process for preparation of the water-soluble dyes containing lithium sulfonate group or ammonium sulfonate group (hereinafter, referred to as "lithium type of dyes" and "ammonium type of dyes", respectively), there are known a process of separation by acid and a process of separation by salt (salting out process).

However, in the former process, the dye deposits in most of cases and usually as the deposited dye is considerably difficult to filter, it takes a long period of time for the separation, and moreover, as the wet cake of the separated dye contains a considerable amount of acid therein, a large amount of expensive lithium hydroxide or ammonium hydroxide is required for the neutralization. Also, by the operation being carried out under a strongly acidic condition the materials of the machinery and apparatus are inevitably greatly restricted.

In the latter process, usually by adding LiCl, NH$_4$Cl, etc. to an aqueous solution of a water-soluble dye containing sodium sulfonate group, i.e., by salting out, there are obtained the crystals of Li salt, NH$_4$ salt, which are recovered by filtration, and after washing, are required to be redissolved and then purified by desalting. Thus, in this process, not only are the expensive LiCl, NH$_4$Cl, etc. needed in large quantities, but also the operations such as washing, redissolving, purification by desalting, etc. are troublesome and industrially disadvantageous.

SUMMARY OF THE INVENTION

An object of this invention is to provide a process wherein an efficient salt exchange can be achieved in the manufacture of a water-soluble dye containing lithium sulfonate group or ammonium sulfonate group from a water-soluble dye containing sodium sulfonate group.

An another object of this invention is to provide a process for manufacturing a water-soluble dye containing lithium sulfonate group or ammonium sulfonate group which has a large solubility useful for an ink-jet printing ink.

In accordance with this invention these objects can be achieved by feeding an aqueous solution of a water-soluble dye containing sodium sulfonate group to a packed column packed with a cationic exchange resin to form an aqueous solution of a dye containing free sulfonic acid group, and neutralizing the resulting aqueous solution with LiOH or NH$_4$OH, followed by concentrating the aqueous solution of a dye thus obtained according to a process for separation through reverse osmotic membrane.

DETAILED DESCRIPTION OF THE INVENTION

As the raw material of the water-soluble dye in this invention any of the dyes containing sodium sulfonate group may be used. For example, there may be mentioned direct dyes, acid dyes, or food dyes having the structure of azo dyes such as monoazo, disazo, trisazo, tetrakisazo compounds, etc.; anthraquinone dyes, anthrapyridone dyes, quinophthalone dyes, methane dyes, phthalocyanine dyes, etc. (See Yutaka Hosoda: "Theoretical Treatment of Manufacturing Chemistry of Dyes", published by Gijutsu-Do 5th Ed., July 15, 1968; "Colour Index" 3rd Ed. Vol. 1, The Society of Dyers and Colourists (1971), etc.)

As examples of these dyes there may be mentioned:
C.I. Direct Black —19, —38, —154
C.I. Direct Blue —86, —199
C.I. Direct Red —4, —80
C.I. Direct Yellow —50, —86, —142
C.I. Acid Black —2, —24, —26
C.I. Acid Blue —19, —185, —254
C.I. Acid Red —8, —35, —37
C.I. Acid Yellow —1, —38
C.I. Food Black —2.

In accordance with this invention aqueous solutions of these water-soluble dyes containing sodium sulfonate group are fed to a packed column of an ion exchange resin, whereby the concentration of the water-soluble dye in the aqueous solution employed in the operation is 0.5 to 20 wt %, and preferably 1 to 10 wt %.

Also, the pH of the aqueous solution employed in the operation is below 7.5, and preferably 6 to 7.5.

As the cation exchange resin used for converting the sodium sulfonate group to free sulfonic acid group use can be made of acid type cation exchange resin, and usually use is made of strong acid type cation exchange resin. These resins are usually formed in particles of cross-linked copolymer of styrene and divinylbenzene as the matrix, into which the ion exchange group such as sulfonic acid group, etc. have been introduced. There are two types, i.e., gel-type and porous-type, either of which may be used in the process of this invention.

The contact treatment of the aqueous solution of a dye and the cation exchange resin is, after the ion exchange resin packed in the packed column has been made into the H-form, carried out by feeding thereto the aqueous solution of a dye containing sodium sulfonate group. In the above case the treating temperature is usually 0° to 50° C., and preferably 10° to 30° C., and the feeding rate is usually 1 to 15 (hr$^{-1}$), preferably 2 to 8 (hr$^{-1}$), and more preferably less than 5 (hr$^{-1}$) in terms of space velocity (hereinafter referred to as S.V.)

The neutralization is carried out by adding a basic aqueous solution of lithium hydroxide or ammonium hydroxide to the aqueous solution of a dye which has passed through the cation exchange resin bed and contains free sulfonic acid group, and then mixing with stirring. The neutralization temperature is 0° to 80° C., and preferably 10° to 30° C.

Next, the procedure in the process for concentration in this invention will be briefly described below.

After the raw material solution, i.e., the aqueous solution of a dye containing lithium sulfonate group or ammonium sulfonate group, which was obtained by the above neutralization, has been adjusted to a predetermined pH, it is placed in an apparatus for reverse osmosis provided with a reverse osmotic membrane, and allowed to pass through the reverse osmotic membrane by applying a predetermined pressure at a predetermined temperature, whereby there is obtained a concentrated aqueous solution of a water-soluble dye containing lithium sulfonate group or ammonium sulfonate group.

As the reverse osmotic membrane various kinds of prior known membranes that can pass water, salts, etc. but dyes can be used. For example, use is made of those membranes which are composed of a high polymer such as cellulose acetates, e.g., cellulose diacetate, triacetate, etc.; polyamides, polybenzimidazolones, polybipheny ethers, etc. and do not pass most, or preferably 98% or more, of dye.

When the concentration process is carried out by the use of a reverse osmotic membrane in accordance with this invention, almost all the salts in the dye that were either present in the raw materials or contaminated during the manufacturing step can be removed.

The reverse osmotic membrane may be of any desired shape or form. Namely, it may be of the form of hollow fiber, tubular membrane, coil-shaped module, branched frame module, or various many others.

The pressure varies depending on the membrane or module used, usually 10 to 50 kg/cm$^2$, and preferably 15 to 35 kg/cm$^2$. The pH should preferably be adjusted to not less than 6, and preferably 6 to 8 from the consideration of the durability of the membrane and the solubility of the dye. Also, the temperature is 10° to 50° C., and preferably 15° to 35° C.

In accordance with the process of this invention the concentrated aqueous solution of the water-soluble dye containing lithium sulfonate group or ammonium sulfonate group is very pure since the impurities accompanied with the raw dye are removed through the step of contact with ion exchange resin and the step of concentration by the reverse osmotic membrance.

Further, in accordance with the process of this invention the amount of the alkali consumed is no more than necessary, and ho particular operation is required between the individual steps, so that the operation is simple and yet the aimed product can be obtained in high yield. Therefore, the process of this invention is industrially an extremely advantageous process.

The water-soluble dye containing lithium sulfonate group or ammonium sulfonate group which was obtained in the above described way is adapted for use as an information recording ink, especially as an ink-jet printing ink. Also, it is advantageous when in use as a coloring matter used in the field of the electronic material such as the color filter, etc. in a solid image-pickup device.

To be concrete, in the ink used in an ink jet printer which contains water and glycols as the main component, in the case where the printer is allowed to stand over a long period of time, the water evaporates at the pointed end of the nozzle, so that the glycols become rich. In the conventional sodium type dyes, while the solubility in water is large, the solubility in glycols is comparatively small, so that the dyes depositing at the pointed end of the nozzle may cause the clogging of the nozzle.

On the other hand, in the case of the lithium type dyes or the ammonium type dyes obtained in accordance with the process of this invention their solubilities in glycols are so large, that no clogging is caused, and therefore, it may be said that this invention can markedly improve the reliability of the ink jet printer.

With reference to some examples this invention will be explained in more detail below, but it should be understood that this invention is not limited thereto.

The color index in examples is abbreviated to C.I.

EXAMPLE 1

250 kg of 2% aqueous solution of C.I. Direct Black $-19$ was fed to a packed column (10 cm in diameter, and 140 cm high) packed with sulfonic acid type cation exchange resin, Diaion SK-1B (H-form, gel-type, manufactured by Mitsubishi Chemical Industries Limited, trade name), from the top at 25° C. at S.V. 2 (hr$^{-1}$).

Then, the recovered liquid was neutralized to pH 7.5 with a 5% aqueous solution of lithium hydroxide. The aqueous solution of dye thus obtained was concentrated at 25° C. under a pressure of 24 kg/cm$^2$ in an apparatus for reverse osmosis provided with polybenzimidazolone membrane having 1.25 m$^2$ of surface area, which gave 27.7 kg of concentrated aqueous solution of a dye containing lithium sulfonate group. The yield of dye was 98% (as measured by O.D. value).

Also, the coloring matter obtained by evaporating the above aqueous solution of dye to dryness was analyzed for sodium and lithium by atomic absorption method, whose results are shown together with the solubilities of the dye in water and diethylene glycol in Table 1 below.

TABLE 1

| | Analytical Value by Atomic Absorption Method (wt %) | | Solubility (wt %) | |
| --- | --- | --- | --- | --- |
| | Na | Li | Water | Diethylene Glycol |
| Coloring Matter Before Treatment | 5.5 | 0 | 21.0 | 8.4 |
| Coloring Matter After Treatment | 0.01 | 1.6 | 22.3 | 18.1 |

EXAMPLE 2

100 kg of 2% aqueous solution of C.I. Food Black −2 was fed to a packed column (10 cm in diameter, 110 cm high) packed with sulfonic acid type cation exchange resin, Diaion SK-1B (H-form), from the top at 25° C. at S.V. 2 (hr$^{-1}$).

Then the recovered liquid was neutralized to pH 7.3 with a 5% aqueous solution of ammonium hydroxide. The aqueous solution of dye thus obtained was concentrated at 25° C. under a pressure of 24 kg/cm$^2$ in an apparatus for reverse osmosis provided with polybenzimidazolone membrane having 1.25 m$^2$ of surface area, which gave 11.1 kg of concentrated aqueous solution of a dye containing ammonium sulfonate group. The yield of the dye was 97% (as measured by O.D. value).

As in the case of Example 1, the analytical values by atomic absorption method and the solubilities are shown in Table 2 below.

TABLE 2

| | Analytical Value by Atomic Absorption Method (wt %) | Solubility (wt %) | |
|---|---|---|---|
| | Na | Water | Diethylene Glycol |
| Coloring Matter Before Treatment | 11.2 | 29.5 | 6.9 |
| Coloring Matter After Treatment | 0.3 | 26.3 | 20.5 |

Further, the result of the elementary analysis is also shown in Table 3.

TABLE 3

| | C | H | N |
|---|---|---|---|
| Calculated Value (%) | 38.8 | 3.9 | 15.7 |
| Analytical Value (%) | 39.0 | 3.6 | 15.2 |

EXAMPLE 3

250 kg of 2% aqueous solution of C.I. Direct Blue −86 was fed to a packed column (15 cm in diameter, and 85 cm high) packed with sulfonic acid type cation exchange resin (H-form), Diaion SK-1B, from the top at 23.5° C. at S.V. 2 (hr$^{-1}$).

Then the recovered liquid was neutralized to pH 8.0 with a 2% aqueous solution of lithium hydroxide. The aqueous solution of dye thus obtained was concentrated in an apparatus for reverse osmosis provided with polybenzimidazolone membrane having 1 m$^2$ of surface area at 23° C. under a pressure of 25 kg/cm$^2$, which gave 22 kg of concentrated aqueous solution of a dye containing lithiuim sulfonate group. The yield of the dye was 96% (as measured by O.D. value). The analytical values of sodium and lithiuim in the coloring matter by atomic absorption method and the solubilities of the dye in water and diethylene glycol are shown in Table 4.

TABLE 4

| | Analytical Value by Atomic Absorption Method (wt %) | | Solubility (wt %) | |
|---|---|---|---|---|
| | Na | Li | Water | Diethylene Glycol |
| Coloring Matter Before Treatment | 8.1 | 0 | 41.5 | 7.3 |
| Coloring Matter After Treatment | 0.2 | 2.3 | 36.0 | 22.3 |

While the invention has been described in detail and with reference to specific embodiments thereof, it will be apparent to one skilled in the art that various changes and modifications can be made therein without departing from the spirit and scope thereof.

What is claimed is:

1. A process for preparation of water-soluble dye containing lithium sulfonate group or ammonium sulfonate group which comprises feeding an aqueous solution of a water-soluble dye containing sodium sulfonate group to a packed column packed with acid type cation exchange resin (H-form) to form an aqueous solution of a dye containing free sulfonic acid group, and neutralizing the resulting solution with LiOH or NH$_4$OH, followed by concentrating the solution of the dye according to a process for separation through, reverse osmotic membrane.

2. The process for preparation of a water-soluble dye containing lithium sulfonate group or ammonium sulfonate group as defined in claim 1, wherein the cation exchange resin is a sulfonic acid type cation exchange resin, composed of particulate cross-linked copolymer of styrene and divinylbenzene as the matrix.

3. The process for preparation of a water-sobluble dye containing lithium sulfonate group or ammonium sulfonate group as defined in claim 1, wherein the concentration of the water-soluble dye containing sodium group is 0.5 to 20 wt %.

4. The process for preparation of a water-soluble dye containing lithium sulfonate group or ammonium sulfonate group as defined in claim 1, wherein the pH of the aqueous solution of the dye containing sodium sulfonate group is 6 to 7.5.

5. The process for preparation of a water-soluble dye containing lithium sulfonate group or ammonium sulfonate group as defined in claim 1, wherein the aqueous solution of a dye containing sodium sulfonate group is fed to a packed column at a feeding rate of 1 to 15 (hr$^{-1}$) in terms of space velocity at a temperature of 0° to 50° C.

6. The process for preparation of a water-soluble dye containing lithiumسulfonate group or ammonium sulfonate group as defined in claim 1, wherein the reverse osmotic membrane is made of polymer selected from cellulose acetate, polyamide, polybenzimidazolone, or polybiphenyl ether type.

7. The process for preparation of a water-soluble dye containing lithium sulfonate group or ammonium sulfonate group as defined in claim 1, wherein the reverse osmotic membrane is made of polymer of polybenzimidazolone type.

8. The process as defined in claim 1, wherein the concentration according to a process for separation through reverse osmotic membrane is carried out at a temperature of 10° to 50° C. under a pressure of 10 to 50 kg/cm$^2$.

9. The process as defined in claim 1, wherein the concentration according to a process for separation through reverse osmotic membrane is carried out at a temperature of 15° to 35° C. under a pressure of 15 to 35 kg/cm$^2$.

* * * * *